July 18, 1933.　　B. W. ST. CLAIR ET AL　　1,919,079
ELECTRICAL INSTRUMENT
Filed Oct. 22, 1931
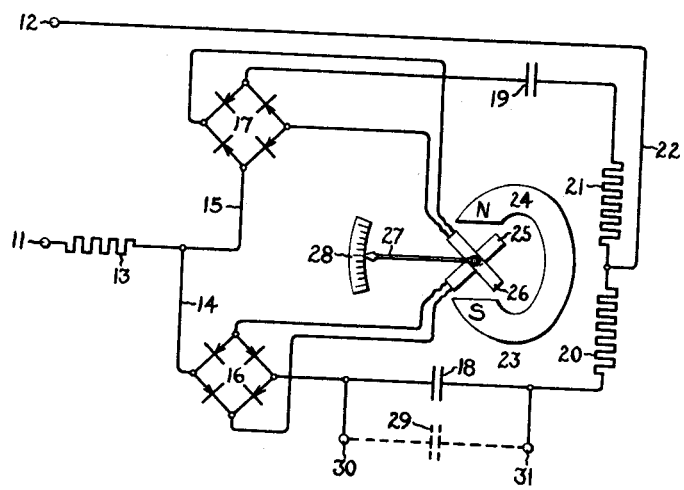
Inventors:
Byron W. St.Clair,
John F. Quinn,
by Charles W. Allen
Their Attorney.

Patented July 18, 1933

1,919,079

UNITED STATES PATENT OFFICE

BYRON W. ST. CLAIR AND JOHN F. QUINN, OF EAST LYNN, MASSACHUSETTS, ASSIGNORS TO GENERAL ELECTRIC COMPANY, A CORPORATION OF NEW YORK

ELECTRICAL INSTRUMENT

Application filed October 22, 1931. Serial No. 570,400.

Our invention relates to electrical instruments and particularly instruments for measuring capacity, and has for its principal object the provision of a device which will indicate values of capacity directly and which will be substantially independent of variations in frequency or voltage of the source of current used in making the measurement. Another object of our invention is the provision of an arrangement for obtaining sensitive indications in an alternating-current circuit. Other objects and advantages will become apparent as the description proceeds.

In accordance with our invention we connect to a source of alternating current a pair of parallel circuits each containing a resistor and a condenser of fixed values, and a full-wave rectifier. A ratio instrument of the direct-current or d'Arsonval type is utilized to obtain an indication of the relative currents flowing in the two circuits and has each of its crossed coils connected in one of the parallel circuits through the rectifier. The condenser, the capacity of which is to be measured, is connected in parallel with one of the condensers which forms a permanent part of the circuit, and the capacity of the measured condenser determines the increase in current through the branch of the circuit in which it is connected. The circuit is balanced so that the ratio instrument gives a zero deflection without the condenser to be measured in the circuit and is calibrated to read values of added capacity when the condenser to be measured is connected into the circuit. Since indications are dependent only upon the ratio of currents flowing in the two circuits, and since variations in voltage or frequency cause only variations in equal proportion in the currents in the two circuits, the indications of the instrument are independent of variations in voltage or frequency of the current supply. The features of our invention which we believe to be novel and patentable will be pointed out in the claims appended hereto.

For a more complete understanding of our invention reference may be had to the accompanying drawing illustrating an arrangement whereby our invention may be carried out. The terminals 11 and 12 are connected to any suitable source of alternating current. A resistor 13 joins the terminal 11 to one common connection of the parallel circuits 14 and 15 comprising respectively the rectifiers 16 and 17, condensers 18 and 19, and resistors 20 and 21. The return lead 22 joins the other common connection of the parallel circuits to the terminal 12. Although a ratio instrument of any suitable type may be employed we prefer, for the sake of greater sensitivity, to use a direct-current instrument 23 in connection with rectifiers. The instrument 23, the construction of which forms no part of our invention, may be of the d'Arsonval type comprising a permanent magnet 24 and a pair of coils 25 and 26, attached to the movable element which also carries a pointer 27 cooperating with the scale 28. Coil 25 is connected in circuit 14 through the rectifier 16 and coil 26 is connected in the parallel circuit 15 through rectifier 17. Rectifiers 16 and 17 may be of any suitable type but we prefer to use full-wave rectifiers, employing copper-oxide elements arranged in the form of a bridge in a manner well known in the art.

In making measurements of a condenser 29 of unknown capacity, the condenser 29 is connected across terminals 30 and 31, so as to be in parallel with condenser 18. The reactance of circuit 14 is thereby reduced, permitting the current therein to increase relatively to the current in circuit 15. Consequently the ratio meter 23 is deflected, and the magnitude of its deflection provides an indication of the capacity of condenser 29.

It will be understood that suitable precautions are to be taken to eliminate as much as possible inductive effects in the parallel circuits 14 and 15, although resistors 13, 20 and 21 serve to minimize unavoidable inductive effects. At a given voltage and frequency the magnitudes of the currents flowing are determined by the respective values of resistance and capacity of resistors 13, 20, and 21 and condensers 18 and 19. These values are chosen to give a range of current values in coils 25 and 26 for all normal variations in frequency and voltage of the current supplied at terminals 11 and 12 which will fall within the range for which instrument 23 is designed. Since instruments of this type operate satisfactorily throughout a wide current range, the accuracy of our capacity measuring device remains unimpaired by any normal fluctuations which might be expected in an alternating current supply circuit.

Although in the apparatus illustrated we have shown an arrangement for introducing the condenser 29 of unknown capacity into the circuit by connecting it in parallel with condenser 18 it will be understood that our invention is not limited to this exact arrangement but that condenser 29, for example, might also be connected in series with condenser 18, in parallel with the portion of resistor 20, or might be substituted in place of condenser 18.

While we have described our invention in concrete form and as operating in a specific manner in accordance with the provisions of the patent statutes, it should be understood that we do not limit our invention thereto since various modifications thereof will suggest themselves to those skilled in the art without departing from the spirit of our invention, the scope of which is set forth in the appended claims.

What we claim as new and desire to secure by Letters Patent of the United States, is:

1. In combination with a source of alternating current, a capacity measuring device comprising a pair of parallel circuits supplied by said source of current, each of said circuits comprising a resistor, a condenser, and a rectifier in series, means for connecting an unknown capacity in parallel with one of said condensers, and means responsive to the ratio of the currents flowing in said parallel circuits.

2. A capacitance measuring device comprising in combination with a source of alternating current, a ratio instrument, a resistor, a pair of parallel circuits supplied by said alternating-current source in series with said resistor, said parallel circuits each including a condenser, a resistor, and a bridge of four copper-oxide elements arranged as a full-wave rectifier, one of said condensers being arranged for parallel connection with the unknown capacitance to be measured, said ratio instrument having a pair of crossed coils each of which is connected in one of said parallel circuits through one of said full-wave rectifiers.

3. A capacity measuring devices comprising in combination with a source of alternating current, a ratio instrument and a pair of parallel circuits supplied by said source and each including capacitance, resistance, and a full-wave rectifier, an unknown capacity to be measured forming a portion of one of said circuits, said ratio instrument having a pair of crossed coils each of which is connected in one of said parallel circuits through one of said full-wave rectifiers.

BYRON W. ST. CLAIR.
JOHN F. QUINN.